United States Patent
Hirsch et al.

(10) Patent No.: US 9,626,374 B2
(45) Date of Patent: *Apr. 18, 2017

(54) OPTIMIZING A PARTITION IN DATA DEDUPLICATION

(71) Applicant: INTERNATIONAL BUSINESS MACHINES CORPORATION, Armonk, NY (US)

(72) Inventors: Michael Hirsch, Mazkeret Batya (IL); Ariel J. Ish-Shalom, Tel Aviv (IL); Thomas S. Klein, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/560,261

(22) Filed: Dec. 4, 2014

(65) Prior Publication Data
US 2015/0088843 A1 Mar. 26, 2015

Related U.S. Application Data

(63) Continuation of application No. 13/732,537, filed on Jan. 2, 2013, now Pat. No. 8,935,222.

(51) Int. Cl.
*G06F 7/00* (2006.01)
*G06F 17/30* (2006.01)
*G06F 3/06* (2006.01)

(52) U.S. Cl.
CPC ...... *G06F 17/30159* (2013.01); *G06F 3/0641* (2013.01); *G06F 17/30156* (2013.01); *G06F 17/30339* (2013.01)

(58) Field of Classification Search
CPC ............ G06F 3/0641; G06F 17/30156; G06F 17/3015; G06F 17/30339
USPC ................ 707/664, 692, 694, 723, 933, 698
See application file for complete search history.

(56) References Cited

U.S. PATENT DOCUMENTS

| | | | |
|---|---|---|---|
| 7,504,969 B2 | 3/2009 | Patterson et al. | |
| 8,086,799 B2 | 12/2011 | Mondal et al. | |
| 8,204,866 B2 | 6/2012 | Chaudhuri et al. | |
| 8,370,309 B1 | 2/2013 | Ramarao et al. | |
| 8,484,170 B2 | 7/2013 | Aronovich et al. | |
| 2009/0259701 A1 | 10/2009 | Wideman et al. | |

(Continued)

FOREIGN PATENT DOCUMENTS

CN 102222085 A 10/2011

*Primary Examiner* — Md. I Uddin
(74) *Attorney, Agent, or Firm* — Griffiths & Seaton PLLC

(57) ABSTRACT

For optimizing a partition of a data block into matching and non-matching segments in data deduplication using a processor device in a computing environment, a sequence of matching segments is split into sub-parts for obtaining a globally optimal subset, to which an optimal calculation is applied. The solutions of optimal calculations for the entire range of the sequence are combined, and a globally optimal subset is built by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments.

30 Claims, 5 Drawing Sheets

PARTITION OF A DATA CHUNK

(56) References Cited

U.S. PATENT DOCUMENTS

| | | |
|---|---|---|
| 2010/0205163 A1 | 8/2010 | Eshghi et al. |
| 2012/0016846 A1 | 1/2012 | Anglin |
| 2012/0030477 A1* | 2/2012 | Lu .................. G06F 11/1453 713/189 |
| 2012/0078858 A1 | 3/2012 | Nagpal |
| 2012/0158709 A1 | 6/2012 | Gaonkar et al. |
| 2012/0191670 A1 | 7/2012 | Kennedy et al. |

\* cited by examiner

PARTITION OF A DATA CHUNK

500

$C[i,j]$    Cost of optimal solution for items $i, i+1,....j-1, j$
$PS[i,j]$   Optimal partition for items $i, i+1,....j-1, j$ Solution:   $C[1,n]$    $PS[1,n]$
Initialize: $C[i,i]$    $PS[i,i]$
            $C[i,i-1]$  $PS[i,i-1]$ Each item depends on those
    to its LEFT in the same ROW
    BELOW it in the same COLUMN

600

Recursion:   EITHER stay with   0000...0
             OR there is a 1 in some position   k $$C[i,j] \leftarrow \min \begin{cases} (\mathit{diff} + 1)\, FE \\ \min_{i \leq k \leq j}\bigl(C[i,k-1] + C[k+1,j] + \mathrm{cost}(k)\bigr) \end{cases}$$

| L | R | f(L,R) |
|---|---|--------|
| 1 | 1 | -1 |
| 0 | 1 | 0 |
| 1 | 0 | 0 |
| 0 | 0 | 1 |

$$\mathrm{cost}(k) = s(k) + (1 - R - L)FE$$

OPTIMIZING A PARTITION IN DATA DEDUPLICATION

REFERENCE TO RELATED APPLICATIONS

This application is a Continuation of U.S. patent application Ser. No. 13/732,537, filed on Jan. 2, 2013, the contents of which are incorporated herein by reference.

BACKGROUND OF THE INVENTION

Field of the Invention

The present invention relates in general to computers, and more particularly for optimizing a partition in data deduplication in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for optimizing a partition of a data block into matching and non-matching segments in data deduplication using a processor device, in a computing environment. In one embodiment, by way of example only, the method comprises: splitting a sequence of the matching segments into sub-parts for obtaining a globally optimal subset; applying an optimal calculation operation on the sub-parts of the matching segments; combining solutions of the optimal calculation operation of the sub-parts into the optimal calculation operation for an entire range of the sequence of the matching segments; and building the globally optimal subset by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments.

In another embodiment, a computer system is provided for optimizing a partition of a data block into matching and non-matching segments in data deduplication using a processor device, in a computing environment. The computer system includes a computer-readable medium and a processor in operable communication with the computer-readable medium. In one embodiment, by way of example only, the processor, splits a sequence of the matching segments into sub-parts for obtaining a globally optimal subset; applies an optimal calculation operation on the sub-parts of the matching segments; combines solutions of the optimal calculation operation of the sub-parts into the optimal calculation operation for an entire range of the sequence of the matching segments; and builds the globally optimal subset by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments.

In a further embodiment, a computer program product is provided for optimizing a partition of a data block into matching and non-matching segments in data deduplication using a processor device, in a computing environment. The computer-readable storage medium has computer-readable program code portions stored thereon. The computer-readable program code portions include a first executable portion that, splits a sequence of the matching segments into sub-parts for obtaining a globally optimal subset; applies an optimal calculation operation on the sub-parts of the matching segments; combines solutions of the optimal calculation operation of the sub-parts into the optimal calculation operation for an entire range of the sequence of the matching segments; and builds the globally optimal subset by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
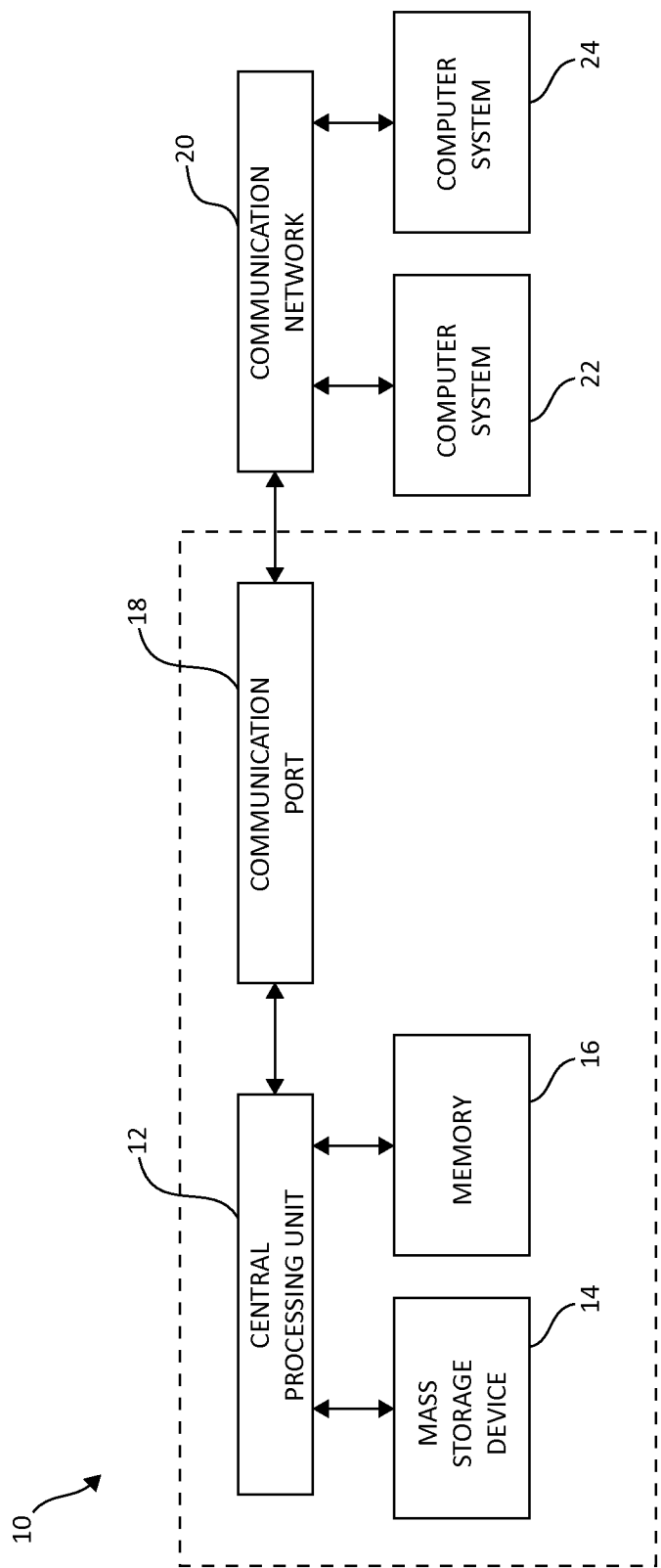
FIG. 1 is a block diagram illustrating a computing system environment having an example storage device in which aspects of the present invention may be realized.

Data deduplication refers to the reduction and/or elimination of redundant data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. A data deduplication system uses some mechanism to identify substrings of data that have already been observed and are currently stored in its storage subsystem (e.g. referred to as "matches"). These substrings of previously existing data may be contiguous or may be separated by substrings of data that have not been previously observed (e.g. referred to as "mismatches" or "non-matches"). The output of this identifying process (which shall be referred to as the input of the present invention described herein) is a list of matches, each consisting of a pair of pointers, one to the source, one to the destination, and the size of the matching substring. More precisely, a list of matches induces a partition (e.g., an input partition) of the input data into substrings that are either matches or mismatches, and this partition is the input to the process described herein.

Each match incurs a metadata overhead (e.g. a pointer to where the common data can be found). The small matches must be weighed against the cost of maintaining this metadata. In addition, as data is modified, it is natural for matches to show a level of fragmentation. This adds overhead when deduplicated data must be reconstituted, for example for restore purposes. The deduplication system must weigh the pros and cons of each match in isolation and in conjunction with all the other matches. This weighing the pros and cons of each match in isolation and in conjunction with all the other matches is the focus of the present invention as described herein.

A simplistic solution may be to build the output by just copying the input. In other words, accept exactly the partition found by listing all the matches. However, such a solution ignores the fact that at least a part of the matches are not worth being retained, as they might cause too high of a degree of fragmentation, or require too much metadata overhead. The challenge is therefore to decide which matches should be kept, and which should be ignored. Therefore, the illustrated embodiments provide a solution for optimizing a partition in data deduplication. In one embodiment, by way of example only, for modifying an input partition of a data block having both matching segments and non-matching segments, an optimal calculation operation is applied in polynomial time to the matching segments for selecting a globally optimal subset of the input partition according to overhead considerations for minimizing a deduplicated file (e.g., an overall size of the deduplicated file) by determining a trade off for both a time complexity and a space complexity.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
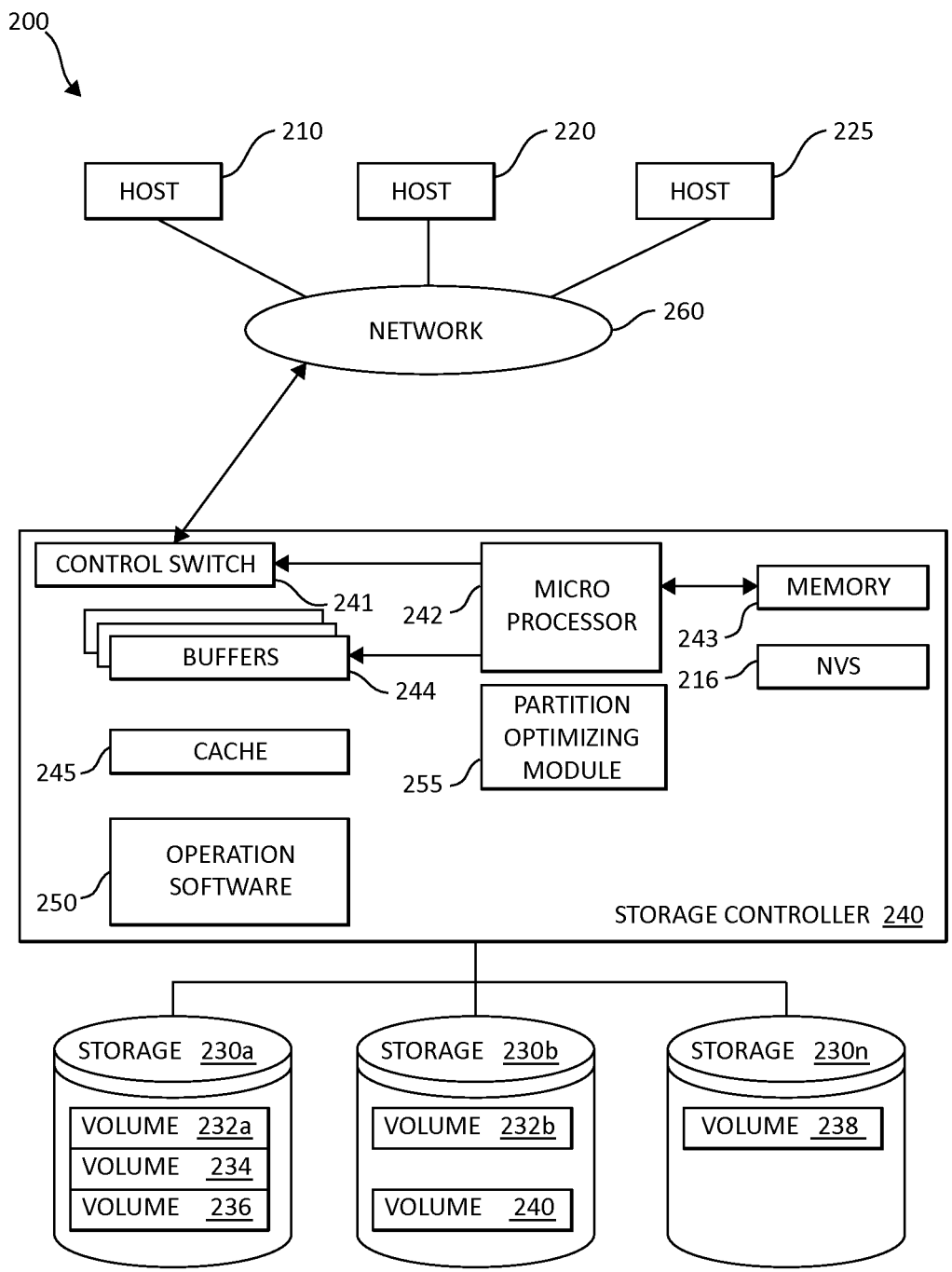
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a partition optimizing module 255. The partition optimizing module 255 may work in conjunction with each and every component of the storage controller 240, the hosts 210, 220, 225, and storage devices 230. The partition optimizing module 255 may be structurally one complete module or may be associated and/or included with other individual modules. The partition optimizing module 255 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the partition optimizing module 255, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, partition optimizing module 255 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the partition optimizing module 255 may also be located in the cache 245 or other components. As such, the partition optimizing module 255 maybe used as needed, based upon the storage architecture and users preferences.

Figure 3:
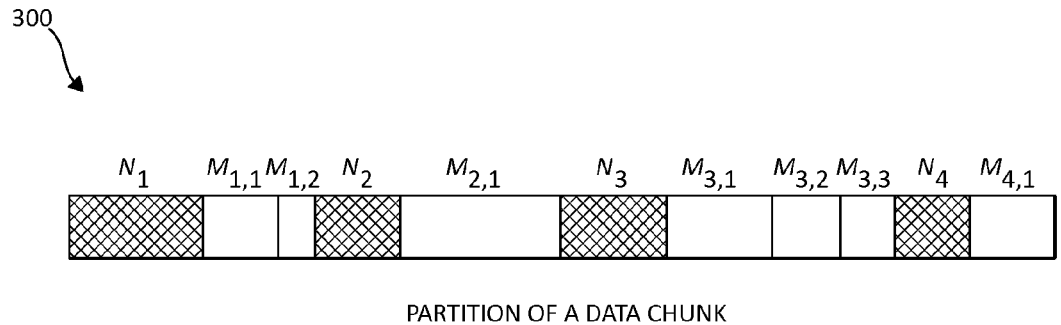
FIG. 3 is a diagram illustrating a partition of a data chunk in a computer system in which aspects of the present invention may be realized.

FIG. 3 is a diagram illustrating a partition of a data chunk in a computer system in which aspects of the present invention may be realized. As illustrated in FIG. 3, non-matches, represented by the grey rectangles, contain new data and are indexed $N_1, N_2, \ldots, N_k$. The Matches, drawn as the white/clear rectangles, contain data that has previously appeared in the repository, and will be stored by means of pointers of the form (address, length); the matching parts between the non-matching blocks $N_i$ and $N_{i+1}$ are indexed $M_{(i,1)}, M_{(i,2)}, (\ldots), M_{(i,j_i)}$. The non-matching parts cannot be consecutive because this is new data, and any stretch of such new characters is considered a new, single part. The matching parts, on the other hand, may consist of several different sub-parts that are located in different places on the disk; each sub-part needs therefore a pointer of its own. To illustrate these definitions, by way of example only, suppose that the given text consists of the 22 characters, indexed from 1 to 22:

a b c d e f b c d d e f b c x y z c d e f w

The compressed form would then be a b c d e f (2,3) (4,5) x y z (3,4) w where the numbers in parentheses are pointers of the form (address, length). In this specific example, the non-matches are $N_1$=a b c d e f, $N_2$=x y z and $N_3$=w; the matches are $M_{1,1}$=(2,3), referring to the substring starting at address 2 and having length 3, that is, the string b c d, $M_{1,2}$=(4,5), referring to the substring starting at address 4 and having length 5, that is, the string d e f b c, and $M_{2,1}$=(3,4), referring to the substring starting at address 3 and having length 4, that is, the string c d e f. FIG. 3 is a schematic view of an extension of this example, including also elements $M_{3,1}$, $M_{3,2}$, $M_{3,3}$, $N_4$, $M_{4,1}$, but showing only the elements, and not the characters or (address,length) pairs they represent.

By way of example only, two functions that are considered are defined for these matching and non-matching parts. A cost function c( ) is used for giving the price that is incurred for storing the pointers in the meta-data; typically, all pointers are of fixed length E (e.g, as described herein E is equal to 24 bytes). In other words, $c(N_i)=c(M_{i,j})=24$ for all indexes, so that the cost for the meta-data depends only on the number of parts, which is $k+\Sigma_{t=1}^{k} j_t$. The second function s( ) measures, for each part, the size of the data on the disk. So that $s(N_i)$ will be just the number of bytes of the non-matching part, as these new bytes have to be stored physically somewhere, and $s(M_{i,j})=0$, since no new data is written to the disk for a matching part. However, it is shall be defined that $s(M_{i,j})$=length for a block $M_{i,j}$ that is stored by means of a pointer of the form (address, length), which means that the size will be defined as the number of bytes written to the disk in case a decision is made to ignore the fact that $M_{i,j}$ has occurred earlier and thus has a matching part already in the repository.

The compressed data consists of the items written to the disk and also the pointers in the meta-data. Yet these cannot necessarily be traded one to one, as storage space for the meta-data will generally be more expensive. As used throughout, an assumption is made that there exists a multiplicative factor F such that, in the calculations described herein, one byte of meta-data may be counted as equivalent to F bytes of data written to the disk. This factor need not be constant and may dynamically depend on several run-time parameters. Practically, F will be stored in a variable and may be updated when necessary, but F shall be used in the sequel as if it were a constant. Given the above notations, the following equation illustrates the size of the compressed file:

$$F \cdot E \cdot \left(k + \sum_{t=1}^{k} j_t\right) + \sum_{i=1}^{k} s(N_i), \quad (1)$$

However, the equation for the size of an uncompressed file is illustrated by:

$$\sum_{i=1}^{k} \left(s(N_i) + \sum_{t=1}^{j_i} s(M_{i,t})\right). \quad (2)$$

The optimization problem considered herein is based on the fact that a partition obtained as input may be altered. The non-matching parts $N_i$ may not be touched, so the only degree of freedom is to decide, for each of the matching parts $M_{i,j}$, whether the corresponding pointer should be kept, or whether an alternative choice is selected to ignore the match and treat the match as if it were a non-matching segment. There is a priori nothing to be gained from such a decision: the pointer in the meta-data is changed from matching to non-matching, but incurs the same cost, and some data has been added to the disk, so there will always be a loss. Notwithstanding, the following example illustrates that a gain may be achieved in certain cases. Consider the block $M_{1,2}$ in FIG. 3. If a decision is made to ignore its matching counterpart, the data of $M_{1,2}$ has to be written to the disk, but it is contiguous with the data of $N_2$. Thus, the two parts may therefore be fused, which reduces the number of meta-data entries by one. This will result in a gain if $s(M_{1,2})<F*E$. Moreover, if indeed the decision is made to consider $M_{1,2}$ as a non-matching block, this will leave $M_{1,1}$ as a single match between two non-matches. In this case, ignoring the match may allow to unify the three blocks $M_{1,1}$, $N_2$, reducing the number of meta-data entries by two. This will be advantageous even if $s(M_{1,2})<2F*E$. More generally, any matching blocks having non-matching blocks touching on at least one of their sides may be candidates for such a fusion, which can trigger even further unifications. Yet these are not the only cases: even matching blocks touching only other matching blocks may profit from unification. However, this is not true for single matching blocks whose neighbors both are also matching, as seen in position $M_{3,2}$ in FIG. 3, because data is added to the disk, but no meta-data is removed, just one of the entries is changed. But there might be a stretch of several matching blocks that can profit from unification.

It should be noted that devising a new partition is not only a matter of trading a byte of meta-data versus F bytes of disk data. Reducing the number of entries in the meta-data has also an effect on the time complexity, since each entry requires an additional read operation. For dealing with such time/space tradeoffs, it is assumed herein that the multiplicative factor F already takes also the time complexity into account. In other words, the multiplicative factor F reflects an estimation price/cost of how many bytes of disk space it will cost in order to save one byte of meta-data, considering all aspects, including disk space, CPU and/or input/output (I/O).

In one embodiment, by way of example only the present invention, as described herein, provides an optimal way to select an appropriate subset of the input partition that minimizes the size of the compressed file. In alternative embodiments, the present invention may simply accept the original partition or use some simple heuristic. Although, accepting the original partition has the advantage of not requiring any calculations, merely accepting the original partition may results in much waste of space and time resources. Also, using a heuristic such as, for example, keeping the ratio of the number of non-matching elements to the number of accepted matching elements between predefined limits, may result in a faster implementation, but there is no guarantee of optimality, so the performance may be very inefficient from the storage point of view.

Thus, as illustrated below in FIG. 4, the illustrated embodiments provide a solution for optimizing a partition in data deduplication. In one embodiment, by way of example only, for modifying an input partition of a data block having both matching segments and non-matching segments, an optimal calculation operation is applied in polynomial time to the matching segments for selecting a globally optimal subset of the input partition according to overhead considerations for minimizing a deduplicated file by determining a trade off for both a time complexity and a space complexity. In one embodiment, an optimal calculation operation is applied individually on each sequence of consecutive matching items (e.g., with M representing the matching items), surrounded on both ends by non-matching items (e.g., with NM representing the non-matching items), since the non-matching cannot be altered, and the only possible transformation is to declare the matching blocks as if they were non-matching. Therefore the originally given NM-items will appear also in the final optimal solution, which allows for concentrating and focusing only on each sub-part individually.

For example, consider then the (matching) elements as indexed $1, 2, \ldots, n$ and the non-matching delimiters as indexed 0 and n+1. It should be noted that for notation: the required partition is returned in the form of a bit-string of length n, with the bit in position i being set to 1 if the i-th ith element should be of type NM, and set to 0 if the i-th element should be of type M. This notation implies immediately that the number of possible solutions is $2^n$, so that an exhaustive search of this exponential number of alternatives is ruled out. For example, even on a moderately large input of size n=100, the algorithm would require billions of hours of CPU on the strongest computers known today. The basis for the non-exponential solution suggested in this invention is the fact that the optimal partition can be split into sub-parts, each of which must be optimal for the corresponding sub-ranges. Thus, the solution may be obtained for a given range by trying all the possible splits into two sub-parts. Such recursive definitions call for resolving the problem by means of dynamic programming. One challenge is that the optimal solution for the range (i,j) may depend on whether its bordering elements, indexed as i−1 and j+1, are of type matching or non-matching, so the optimal solution for range (i,j) might depend on the optimal solution on the neighboring ranges. As such, FIG. 4 illustrates the solution of the present invention for optimizing a partition in a data deduplication system.

Figure 4:
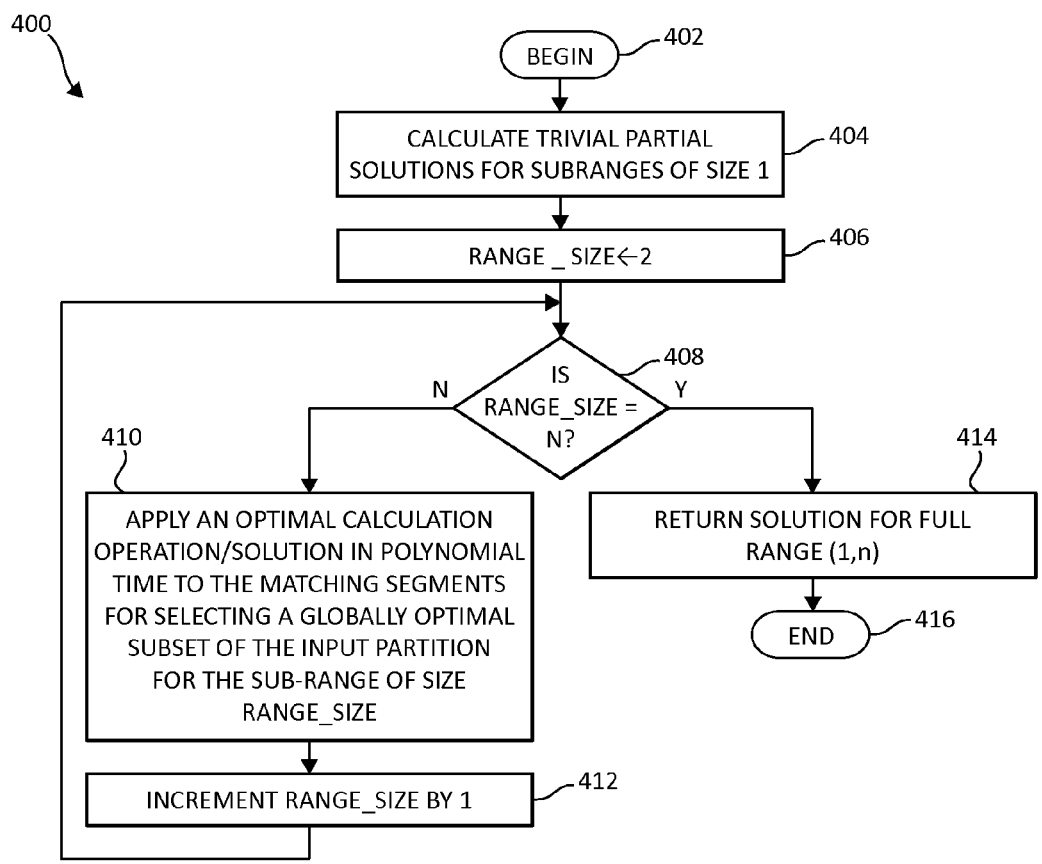
FIG. 4 is a flowchart illustrating an exemplary method for optimizing a partition in data deduplication in which aspects of the present invention may be realized.

Turning now to FIG. 4, a flowchart illustrating an exemplary method 400 for optimizing a partition in data deduplication using a processor device in a computing environment is illustrated. The method 400 begins (step 402). The method 400 calculates trivial partial solutions for subranges of size 1 (step 404). The method 400 then assigns the range size (range_size) a value of 2 (step 406). Next, the method determines if the range size (range_size) is equal to n (step 408). If yes, the method 400 returns the solution for full range (1,n) (step 414). The method 400 then ends (step 416). If no, the method applies an optimal calculation operation/solution in polynomial time to the matching segments for selecting a globally optimal subset of the input partition for the sub-range of size range_size (step 410). The method increments the range size (range_size) by 1 (step 412).

Figure 5:
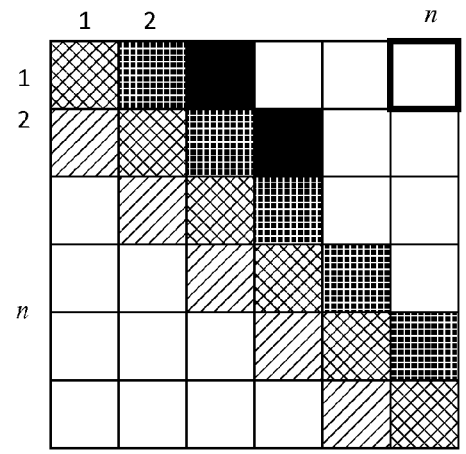
FIG. 5 is a diagram illustrating an optimal partition built by means of two-dimensional dynamic programming tables in which aspects of the present invention may be realized.
Figure 5:
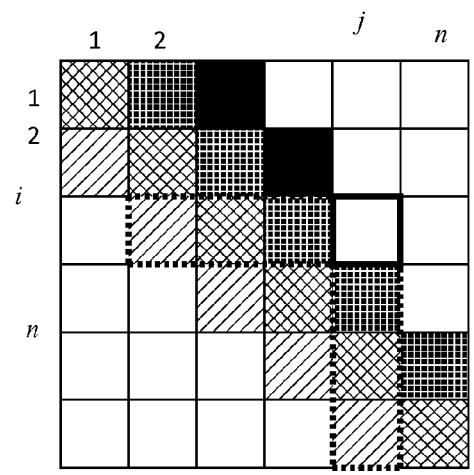

More specifically, as described below in FIG. 5, for optimizing a partition of a data block into matching and non-matching segments in data deduplication using a processor device in a computing environment as discussed in FIG. 4, trivial partial solutions for sub-ranges of size 1 may be calculated. Then, incrementally larger partial solutions for larger sub-ranges are calculated based on the already calculated results and this process is repeated until the current incrementally larger partial solution is the full solution, that is, covers the full range from 1 to n.

As described in FIG. 5, below, the globally optimal subset (e.g., the optimal partition) may be built by means of two-dimensional dynamic programming tables. FIG. 5 is a diagram illustrating an optimal partition built by means of two-dimensional dynamic programming tables in which aspects of the present invention may be realized. The cost of the globally optimal subset (e.g., the optimal partition) may be evaluated by means of a two-dimensional dynamic programming table represented by a matrix C[i,j], and the optimal partition will be stored in a similar table represented by a matrix PS[i,j], that holds the optimal partition for the given parameters, which is a bit-string of length j−i+1. In other words, the cost of the globally optimal subset (e.g., the optimal partition) for elements indexed $i, i+1, \ldots, j-1, j$ is stored at C[i,j] and the corresponding optimal partition for these elements is stored at PS[i,j].

For $1 \leq i \leq j \leq n$, the element C[i,j], is defined as the global cost of the optimal partition of the sub-sequence of elements $i, i+1, \ldots, j-1, j$, when the surrounding elements it and j+1 are of type NM (e.g., the non-matching segment types). This cost will be given in bytes and reflect the size of the data on disk for non-matching (NM) elements, plus the size of the meta-data for all the elements, using the equivalence factor explained above. In other words, each meta-data entry incurs a cost of FE bytes (F is the multiplicative factor and is variable, and E is the length of each pointer in bytes). As illustrated in FIG. 5, once the two-dimensional dynamic programming tables are filled up, the cost of the optimal solution that is sought for is stored in C[1,n], which is the upper right corner of the matrix highlighted in FIG. 5, and the corresponding partition is given in PS[1,n].

The basis of the calculation, mentioned above in FIGS. 4-5, will be the individual items themselves stored in the main diagonal of the matrix, C[i,i] of the matrix for $1 \leq i \leq n$, as well as the elements just below the diagonal, C[i,i−1]. The elements belonging to a given diagonal appear with identical shading in FIG. 5. The following iterations will then be ordered by increasing difference between i and j. In one embodiment, the iterations will first handle and deal with all sequences of two adjacent elements, which correspond to the diagonal just above the main diagonal in FIG. 5, and then three adjacent elements, corresponding to the next higher diagonal in FIG. 5, and continue up to n adjacent elements. This last element corresponds to the last diagonal in FIG. 5, consisting only of the single box in the upper right corner of the matrix. When calculating the optimal solution for a sequence of l adjacent elements, we can use our knowledge of the optimal solutions for all shorter sub-sequences. In fact, for a sequence of length $l=j-i+1$, the present invention only needs to check the sum of the costs (e.g., global cost) of all possible partitions of the range (i,j) into two disjoint sub-ranges, that is, the cost for the subrange (i,k−1) plus that of the subrange (k+1,j) for some index k, such that $i<k<j$. The costs are initialized for each subrange by the possibility of leaving all the n elements as the matching type. In other words, the problem the present invention wants to solve is to find an optimal partition of the range $1, \ldots, n$. In one embodiment, one possibility is that the partition should not be partitioned at all and leave all elements as matching, symbolized, for example, by the string 0000 . . . 0. In an alternative embodiment, there are some elements that should be turned into NM elements (which will be symbolized by 1's within the string of 0's). Thus, as described above, it is sufficient to attempt to partition the range into 2 (as opposed to more) subranges. As such, either the optimal partition is that there should be no partition (that's 00000 . . . 0), or, if that is not true, then there must be at least one element that will be changed from type M to type NM. For example, suppose the index of a particular element that will be changed from type M to type NM is k. Then all the present invention may need to do is recursively find the optimal partition for the subrange (i,k−1), then for the subrange (k+1,j), and add the costs of the subranges. Doing this for all the possible values of k provides for the ability to choose the optimum partition by choosing the minimal sum.

More specifically, as indicated in the pseudo code, illustrated below, in lines 1 and 3, the table is initialized for ranges of size 0, that is, ranges of type (i+1,i), giving them a cost 0. The line numbers refer to the pseudo code below. In other words, the elements just below the main diagonal of the two-dimensional table C, those with index [i+1,i], are initialized by setting them to zero. The corresponding bitstring in the elements with index [i+1,i] in the PS table is initialized to A, which denotes an empty string. Lines 4-7 handle and process singletons of type [i,i], stored in the main diagonal of the tables. Since there is an assumption that the surrounding elements of the ranges under consideration are both of type NM, in one embodiment, the present invention compares the size s(i) of the matching element with the cost of defining the matching element as non-matching, and letting the matching element be absorbed by the neighboring NM elements. In that case, two elements of the meta-data can be saved, which is checked in line 4.

The main loop of the pseudo code starts then on line 9. The two-dimensional tables C and PS are filled primarily by diagonals, each corresponding to a constant difference diff=j−i between the row and column indices i and j, and within each diagonal, by increasing i. Line 11 redefines j just for notational convenience.

In lines 12-13 of the pseudo code, the table entries are given default values, corresponding to the extreme case of all diff+1 elements in the range between and including i and j remaining matching as initially given in the input. This corresponds to a bitstring of diff+1 zeroes '000 . . . 0' in the PS matrix. As to the cost of the default partition, diff+1 meta data blocks are stored, at the total price of (diff+1)FE.

After having initialized the table C, the loop starting in line 15 of the pseudo code tries to partition the range (i,j) into two sub-pieces. The idea is to consider two possibilities for the optimal partition of the range: either all the diff+1 elements should remain matching, as it is assumed in the default setting that initializes the C[i,j] value of the element in line 12, or there is or there is at least one element whose index will be denoted by k, with i≤k≤j, which in the optimal partition should be turned into a NM-element. The optimal solution is then obtained by solving the problem recursively on the remaining sub-ranges (i,k−1) and (k+1,j). The advantage of this definition is that the surrounding elements of the sub-ranges, i−1 and k for (i,k−1), and k and j+1 for (k+1,j), are again both of type NM, so the same table C can be used. In other words, in one embodiment, the globally optimal subset is determined by recursively applying the optimal calculation operation on sub-ranges (i,k−1) and (k+1,j) wherein the elements surrounding the sub-ranges, i−1 and k for (i,k−1), and k and j+1 for (k+1,j), are of a type of the non-matching segments.

Figure 6:
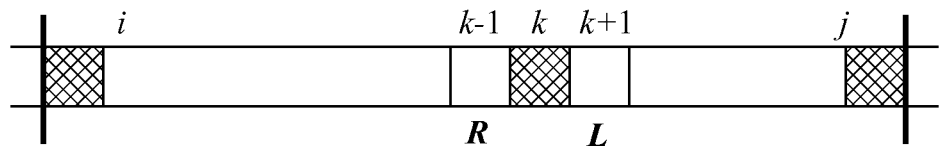
FIG. 6 is block diagram illustrating an alternative partition of a sub-range in which aspects of the present invention may be realized.

FIG. 6 is a diagram illustrating an alternative partition of a sub-range in which aspects of the present invention may be realized. FIG. 6 illustrates the alternative partition of a sub-range (i,j) into two disjoint parts, with L denoting the leftmost element of the right range (k+1,j), and R denoting the rightmost element of the left range (i,k−1). The i and j are indices of matching elements (illustrated in FIG. 6 as white/clear boxes) that are adjacent to non-matching elements (illustrated in FIG. 6 as dark/shaded boxes).

However, to combine the optimal solutions of the subranges into an optimal solution for the entire range, the present invention needs to know/determine whether the elements adjacent to the separating element indexed as k are of type M or NM. For if one or both of the elements adjacent to the separating element indexed as k are NM, the adjacent elements can be merged with the separating element itself, so the meta-data decreases by one or two elements, reducing the price by FE or 2FE. As depicted in FIG. 6, showing an alternative partition of a sub-range, L denotes the leftmost element of the right range (k+1,j), and R denotes the rightmost element of the left range (i,k−1). These values are assigned in lines 16-23 of the pseudo code, including treatment of extreme cases. The general case is depicted in FIG. 6. The present invention requires a function f(L,R), giving the number of additional meta-data elements needed as function of the type, 0 or 1, corresponding, respectively, to matching M or non-matching NM elements, of the bordering elements L and R. This function f(L,R) should give values according to the table appearing in FIG. 6 just below the alternative partition of the sub-ranges. A possible function is thus f(L,R)=1−L−R, which explains the definition of the variable newcost in line 24 of the pseudo code. The present invention then checks the sum of the costs of the optimal solutions of the sub-problems (i,k−1) and (k+1,j), plus the cost caused by the separating element k, and keeps the smallest sum of these costs, over all the possible partition points k, in the table C at entry C[i,j]. Mathematically, this is represented by the equation:

$$C[i,j] \to \min[(\text{diff}+1)FE, \min_{i \leq k \leq j}(C[i,k-1]+C[k+1,j]+s(k)+(1-R-L)FE)] \quad (3),$$

where i and j are indicies of elements, L and R are the bordering elements as described above, F is the multiplicative factor and is variable, E is the size of a pointer, and k is the index of the separating element in the alternative partition of sub-ranges. In other words, in order to calculate the value of an element C[i,j] of the matrix, one only needs to refer to elements to its left in the same row, and to elements below it in the same column. This is schematically illustrated in the lower matrix of FIG. 5.

In other words, the problem is finding the optimal partition of (i,j). The 2 sub-problem are: finding the optimal partition of (i,k−1), and finding the optimal partition of (k+1,j). The cost for (i,j) can be obtained by adding the costs for (i,k−1) plus the cost for (k+1 j) plus the cost of combining everything, that is, the cost related to the separating element k. However, at this point it is unknown what is the optimal value of k. As such, in one embodiment, the present invention may try all the possible values of k, from i to j, and calculate the total cost. The minimal such cost is the optimal value that is sought and the index k is recorded for which this minimum is obtained. This index k is denoted below as OK (optimal k).

The index k between i and j for which the optimal partition has been found, if at all, i.e., the optimal partition (e.g., the globally optimal subset of the input partition) with the minimum cost, will be stored in a variable denoted OK. If the default value has been changed, the optimal solution, expressed as a bitstring of length diff+1, is obtained in line 30 of the pseudo code by concatenating the bitstrings corresponding to the optimal solutions of each of the sub-ranges and between them the string '1' corresponding to the element indexed k. The operator || denotes concatenation. The formal pseudo code is given below.

```
1   C[n + 1,n] ← 0        PS[n + 1,n] ← Λ
2   for i ← 1 to n
3     C[i,i − 1] ← 0       PS[i,i − 1] ← Λ
4     if s(i) − FE < FE then
5       C[i,i] ← s(i) − FE   PS[i, i] ← '1'
6     else
7       C[i,i] ← FE          PS[i,i] ← '0'
8   end for i
9   for diff ← 1 to n − 1
10    for i ← 1 to n − diff
11      j ← i + diff
12      C[i, j] ← (diff + 1)FE
13      PS[i, j] ← '000...0' // (length diff + 1)
14      OK ← 0
15      for k ← i to j
16        if k = j then
17          L ← 1
18        else
19          L ← left(PS[k + 1, j])
20        if k = i then
21          R ← 1
22        else
23          R ← right(PS[i,k − 1])
24        newcost ← C[i,k − 1] + C[k + 1, j] + s(k) +
                     (1 − L − R)FE
25        if newcost < C[i, j] then
26          C[i, j] ← newcost
27          OK ← k
28      end for k
29      if OK > 0 then
30        PS[i, j] ← PS[i,OK − 1] || '1' || PS[OK + 1, j]
31    end for i
32  end for diff
```

The complexity of evaluating the dynamic two-dimensional tables is dominated by the loops starting at line number 9. As illustrated above in the pseudo code, for the various iterations performed by the present invention, there are three nested loops, and the loop on k goes from i to j−i=i+diff−1, so the iterations are executed a number of times equal to the constant difference diff, for each possible value of diff and i. The total number of iterations is therefore:

$$\sum_{i=1}^{n-1} i(n-i) = \left[ n\frac{n(n-1)}{2} - \frac{(n-1)n(2n-1)}{6} \right] = \frac{n^3 - n}{6}, \quad (3)$$

where n is the input parameter of the number of consecutive blocks dealt with in each call to the program for the optimal partition (e.g., the globally optimal subset), and is the number of consecutive matching items between two non-matching ones.

Such a cubic number of iterations might be prohibitive, even though the coefficient of $n^3$ is at most 0.17. In terms of the bit-string notation: the result of applying the deduplication algorithm/calculation operation of a large input chunk is a sequence of matching or non-matching items, which is denoted by a bit-string of the form, e.g., 10010001011100000001000 . . . . The optimal partition (the global optimal subset) algorithm is then invoked for each of the 0-bit runs, which, on the given example, are of lengths 2, 3, 1, 0, 0, 7, etc. There is no need to call the procedure when n=0.

If certain values of n are too large, the present invention as described above may try to reduce the time complexity a priori by applying a preliminary filtering heuristic that will not impair the optimal solution. For example, in one embodiment, the present invention may consider the maximal possible gain from declaring a matching item (e.g., indicated by a "0") to be non-matching (e.g., indicated by a "1"). This happens if the two adjacent blocks are non-matching themselves, and then all 3 separate items could be merged into a single segment. The savings would then be equivalent to 2FE bytes, which have to be counterbalanced by the loss of s(i) bytes that are not referenced anymore, so have to be stored explicitly. Thus, if s(i)>2FE, the i-th M-element will surely not be transformed into an NM-element. It follows that s(i)>2FE is a sufficient condition for keeping the value of the i-th bit in the optimal partition as 0.

The heuristic will then scan all the input items and check this condition for each 0-item. If the condition holds, the element can be declared to remain of type 0, which partitions the rest of the elements into two parts. In other words, each element of the input partition is scanned for verifying the condition (e.g., that the value of the function s(i) is greater that 2FE bytes, s(i)>2FE, where F is the multiplicative factor and is a variable, and E is the size of a pointer, and s(i) is the second function for measuring, for both the matching segments and the non-matching segments, a size of data on a disk. For example, if the middle element of the n elements is thereby declared as keeping its 0-status, the present invention has split the n elements into two parts of size n/2 each, so the complexity is reduced from $$\frac{1}{6}n^3$$

to $$2\frac{1}{6}\left(\frac{n}{2}\right)^3 = \frac{1}{24}n^3.$$

Now, returning to the example bit-string listed as 10010001011100000001000 . . . , in one embodiment, if the boldfaced and underlined elements are those fixed by the heuristic in their 0-status, the algorithm will be invoked with lengths 1, 1, 1, 1, 3, 2, etc. Theoretically, in this scenario the worst case did not change, even after applying this heuristic, but in practice, the largest values of n might be much smaller. Indeed, one of the possible worst cases would be that the condition s(i)>2FE does not hold for any index i, in which case the heuristic would remain with the same value on n as before. Another bad case from the point of view of the time complexity would be that even though there is an index i for which s(i)>2FE, this index is on the border, e.g., i=1 or i=n, so the range between 1 and n would be split into two parts, but not both of size n/2 as in the example above, but rather one of size 0 and the other of size n−1; the result would be that there is hardly any reduction in the time complexity of the algorithm.

There remains a technical problem: the optimal partition evaluated in the C[i,j] matrix is based on the assumption that the surrounding elements i−1 and j+1 were of type 1 (e.g., non-matching type elements), and if the above heuristic is applied, this assumption is not necessarily true. Three approaches are possible to confront this problem by the present invention. First, in one embodiment, the illustrated embodiments described herein may use the value of C[i,j] and the corresponding partition in PS[i,j] and adapt the value locally to the cases if one of the surrounding elements is 0. For example, if the rightmost bit in PS[i,j] is 0, and bit j+1 is also 0, then no adaptation is needed; but if the rightmost bit in PS[i,j] is 1, and bit j+1 is 0, then the optimal values of C[i,j] took into account that elements j and j+1 were merged, which is not true in our case, so the value of C[i,j] has to be increased by one meta-data element, that is by FE. A similar adaptation is needed for the left extremity, element i−1.

Such an adaptation is not necessary optimal, since it might be possible that, had it been known that both of the surrounding elements are not 1, an altogether different solution may be optimal. If the first approach consisted of adapting a solution that is optimal for a different case, and thereby getting a possibly sub-optimal solution for the problem at hand, the second approach might try to prove that this adaptation indeed yields a global optimum.

As a third approach, the definition of the first dynamic two-dimensional table represented by a C[i,j] matrix could be extended to be a four-dimensional table with C[i,j,L,R] being the global cost of the globally optimal subset of elements i, i+1, . . . , j, under the assumption that the bordering elements, being i−1 and j+1 are of the type L and R, where L, R∈(0,1), where L represents the left border of the matching segments and R represents the right border of the matching segments.

While the time complexity is $\theta(n^3)$, the C[i,j] table needs only $n^2$ space. But the strings stored in the PS[i,j] table are of length j−i+1, so that the space for PS[i,j] is also $\theta(n^3)$. The following embodiment reduces the time complexity and stores only a constant amount of bytes, for each entry at the cost of not giving the optimal partition explicitly, but providing enough information for the optimal partition to be built in linear time.

The key to this reduction of the space complexity is storing in PS[i,j] (which may also now be referred to as S[i,j] to avoid confusions) not the string itself, but the value OK at which the range of [i,j] has been split in an optimal way (line 27), or 0, if no such value OK exists. Since the string PS[i,j] served also to provide information on its extremal elements (left and right in lines 19 and 23), these elements have now to be saved in tables LT and RT on their own. The updated pseudo code/algorithm is given below.

```
1    C[n + 1,n] ← 0
2    for i ← 1 to n
3        C[i,i − 1] ← 0
4        if s(i) − FE < FE then
5            C[i,i] ← s(i) − FE    LT[i,i] ← 1    RT[i,i] ← 1
6        else
7            C[i,i] ← FE           LT[i,i] ← 0    RT[i,i] ← 0
8    end for i
9    for diff ← 1 to n − 1
10       for i ← 1 to n − diff
11           j ← i + diff
12           C[i, j] ← (diff + 1)FE
14           S[i, j] ← 0
15           for k ← i to j
16               if k = j then
17                   L ← 1
18               else
19                   L ← LT[k + 1, j]
20               if k = i then
21                   R ← 1
22               else
23                   R ← RT[i,k − 1]
24               newcost ← C[i,k − 1] + C[k + 1, j] + s(k) + (1 − L − R)FE
25               if newcost < C[i, j] then
26                   C[i, j] ← newcost
27                   S[i, j] ← k
28           end for k
29           LT[i, j] ← LT[i, j − 1]
30           RT[i, j] ← RT[i + 1, j]
31       end for i
32   end for diff
```

It should be noted how the elements of LT and RT are updated in each iteration, just referring to shorter ranges of [i,j], that is, a range with smaller diff, which has therefore been treated earlier; LT is then copied from a shorter range with the same left border, and RT is copied from a shorter range with the same right border. While the time complexity remains $\theta(n^3)$, the space complexity has been reduced, since all the saved tables, C, S, LT and RT are of size $O(n^2)$. The table S is only defined for j>i, the others for j≥i. To get the optimal partition for a given sequence of n elements, represented in the form of a bit-string as those stored in the earlier version in the PS matrix, the recursive procedure build_vector with parameters (1, n), as illustrated in the pseudo code below, may be invoked. The procedure either returns a string of zeros, in case no 0-element should be turned into a 1-element, or it retrieves the index k of a 1-element from the table S and then continues recursively on the elements below k and on the elements above k. The running time of build_vector (1,n) is O(n). Formally, the procedure is defined by:

```
     build_vector (i, j)
1        if j > i then
2            k ← S[i, j]
3            if k = 0 then
4                return '000...0' // (length j − i + 1)
5            else
6                return build_vector (i,k − 1) || '1' || build_vector (k + 1, j)
```

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for optimizing a partition of a data block into matching and non-matching segments in data deduplication using a processor device in a computing environment, the method comprising:

applying an optimal calculation operation in polynomial time to the matching segments for selecting the globally optimal subset of the set of the matching segments according to overhead considerations for minimizing an overall size of a deduplicated file by determining a trade off between a time complexity and a space complexity, wherein applying the optimal calculation operation to the matching segments determines which of the matching segments should be preserved;

splitting a sequence of the matching segments into subparts for obtaining a globally optimal subset;

applying the optimal calculation operation on the subparts of the matching segments;

combining solutions of the optimal calculation operation of the sub-parts into the optimal calculation operation for an entire range of the sequence of the matching segments;

building the globally optimal subset by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments; and declaring each of the matching segments that are determined not to be preserved as new segments added to the non-matching segments;

wherein for 1≤i≤j≤n, C[i,j] is a global cost of the globally optimal partition of a sub-sequence of elements i, i+1, . . . , j−1, j, when surrounding elements i−1 and j+1 are of the non-matching segments type, where n is a number of elements and a number of rows and columns in the matrix C.

2. The method of claim 1, further including applying the optimal calculation operation on each sequence of the matching segments that are surrounded on both ends of the matching segments by two of the non-matching segments.

3. The method of claim 1, further including:

applying a plurality of functions for determining a trade off between the time complexity and the space complexity, wherein the plurality of functions include at least a first function for determining a global cost of storing pointers in meta-data and a second function for measuring, for both the matching segments and the non-matching segments, a size of data on a disk, and using a multiplicative factor for counting one byte of meta-data as equivalent to F-bytes of data that are written to the disk, wherein F is the multiplicative factor and is variable.

4. The method of claim 1, further including:

initializing the first two-dimensional table by storing optimal values in a main diagonal of the first two-dimensional table at C[i,i], for 1 i n and just below the main diagonal of the first two-dimensional table at C[i,i−1], wherein default values are provided for initializing the global cost, and ordering a plurality of iterations by an increasing difference between j and i for applying the optimal calculation operation to the matching segments for selecting the globally optimal subset.

5. The method of claim 4, further including, upon filling up the first two-dimensional table:
retrieving the global cost of the globally optimal subset from the first two-dimensional table at location C[1,n], and the corresponding partition from the second two-dimensional table at location PS[1,n].

6. The method of claim 1, further including:
initializing the two-dimensional table by setting a global cost to zero for ranges of a form [i+1,i] with a corresponding bit-string denoted as an empty string, and
comparing, for the ranges of a form [i,i], a size of the matching segments with the global cost of defining the matching segments as being part of the non-matching segments.

7. The method of claim 1, further including:
filling the first two-dimensional table by diagonals, each corresponding to a constant difference represented by the equation diff=j−idiff=j−i, and within each of the diagonals, filling by increasing i, wherein i is the index of a row, j is the index of a column and diff is a constant difference between j and i,
assigning default values in the first two-dimensional table, corresponding to all diff+1 elements in between i and j being defined as matching segments, wherein the default values correspond to a bitstring of diff+1 zeros in the PS[i,j]PS[i,j] matrix, wherein the global cost of a default partition is stored as diff+1 metadata blocks at a total global cost of (diff+1)FE,
where F is the multiplicative factor and is variable and E is a size of one pointer, determining the globally optimal subset by one of accepting the default partition of all of the diff+1 elements for a given range remaining as the matching segments and finding at least one element with index k, with i≤k≤j which is turned into a non-matching element, and then recursively applying the optimal calculation operation on sub-ranges (i,k−1) and (k+1,j), wherein elements surrounding the sub-ranges i−1 and k for (i,k−1), and k and j+1 for (k+1,j), are of a type of the non-matching segments,
checking a sum of the global cost for each possible partition of the range of (i,j) into two sub-ranges (i,k−1) and (k+1,j), and
retaining the smallest sum over all possible k partition points k in the first two-dimensional table.

8. The method of claim 1, further including, performing one of:
executing a first calculation operation for reducing the time complexity, and
executing a second calculation operation for reducing the space complexity.

9. The method of claim 8, further including, for reducing the time complexity, performing one of:
scanning each element indexed i of an input partition for verifying a sufficient condition for ensuring that a value in the globally optimal subset for each element indexed i is equal to zero, wherein the condition is determined by the equation s(i)>2FE, where F is the multiplicative factor and is a variable, and E a size of one pointer, and s(i) is a second function for measuring, for both the matching segments and the non-matching segments, a size of data on a disk, wherein if the condition holds, the element indexed i is declared to remain of type 0, which partitions the rest of the elements into two parts, and
configuring the first two-dimensional table to become a four-dimensional table with C[i,j,L,R] being the global cost of the globally optimal subset of elements i, i+1, □, j, with bordering elements i−1 and j+1 being of type L and R, where L, R∈{0,1}.

10. The method of claim 1, further including, for reducing the space complexity, storing in the PS [i,j] matrix at an entry indexed (i,j) one of a determined value at which a range of (i,j) of the matching segments has been split into sub-parts for obtaining the optimal subset for the range, and zero if the value does not exist.

11. A system for optimizing a partition of a data block into matching and non-matching segments in data deduplication using a processor device in a computing environment, the system comprising:
a processor device operable in the computing storage environment, wherein the processor device for optimizing an input partition of the data block having both the matching segments and the non-matching segments:
applies an optimal calculation operation in polynomial time to the matching segments for selecting the globally optimal subset of a set of the matching segments according to overhead considerations for minimizing an overall size of a deduplicated file by determining a trade off between a time complexity and a space complexity, wherein applying the optimal calculation operation to the matching segments determines which of the matching segments should be preserved;
splits a sequence of the matching segments into sub-parts for obtaining a globally optimal subset;
applies the optimal calculation operation on the sub-parts of the matching segments;
combines solutions of the optimal calculation operation of the sub-parts into the optimal calculation operation for an entire range of the sequence of the matching segments;
builds the globally optimal subset by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments; and
declares each of the matching segments that are determined not to be preserved as new segments added to the non-matching segments;
wherein for 1≤i≤j≤n, C[i,j] is a global cost of the globally optimal partition of a sub-sequence of elements i, i+1, . . . , j−1, j, when surrounding elements i−1 and j+1 are of the non-matching segments type, where n is a number of elements and a number of rows and columns in the matrix C.

12. The system of claim 11, wherein the processor device applies the optimal calculation operation on each sequence of the matching segments that are surrounded on both ends of the matching segments by two of the non-matching segments.

13. The system of claim 11, wherein the processor device:
applies a plurality of functions for determining a trade off between the time complexity and the space complexity, wherein the plurality of functions include at least a first function for determining a global cost of storing pointers in meta-data and a second function for measuring, for both the matching segments and the non-matching segments, a size of data on a disk, uses a multiplicative factor for counting one byte of meta-data as equivalent to F-bytes of data that are written to the disk, wherein F is the multiplicative factor and is variable.

14. The system of claim 11, wherein the processor device:
initializes the first two-dimensional table by storing optimal values in a main diagonal of the first two-dimensional table at C[i,i], for 1≤i≤n and just below the main diagonal of the first two-dimensional table at C[i,i−1], wherein default values are provided for initializing the global cost, and orders a plurality of iterations by an increasing difference between j and i for applying the optimal calculation operation to the matching segments for selecting the globally optimal subset.

15. The system of claim 14, wherein the processor device, upon filling up the first two-dimensional table:
retrieves the global cost of the globally optimal subset from the first two-dimensional table at location C[1,n], and the corresponding partition from the second two-dimensional table at location PS[1,n].

16. The system of claim 11, wherein the processor device:
initializes the two-dimensional table by setting a global cost to zero for ranges of a form [i+1,i] with a corresponding bit-string denoted as an empty string, and compares, for the ranges of a form [i,i], a size of the matching segments with the global cost of defining the matching segments as being part of the non-matching segments.

17. The system of claim 11, wherein the processor device:
fills the first two-dimensional table by diagonals, each corresponding to a constant difference represented by the equation diff=j−i, and within each of the diagonals, filling by increasing i, wherein i is the index of a row, j is the index of a column and diff is a constant difference between j and i, assigns default values in the first two-dimensional table, corresponding to all diff+1 elements in between i and j being defined as matching segments, wherein the default values correspond to a bitstring of diff+1 zeros in the PS [i,j] matrix, wherein the global cost of a default partition is stored as diff+1 metadata blocks at a total global cost of (diff+1)FE, where F is the multiplicative factor and is variable and E is a size of one pointer, determines the globally optimal subset by one of accepting the default partition of all of the diff+1 elements for a given range remaining as the matching segments and finding at least one element with index k, with i≤k≤j which is turned into a non-matching element, and then recursively applying the optimal calculation operation on sub-ranges (i,k−1) and (k+1,j), wherein elements surrounding the sub-ranges i−1 and k for (i,k−1), and k and j+1 for (k+1,j), are of a type of the non-matching segments, checks a sum of the global cost for each possible partition of the range of (i,j) into two sub-ranges (i,k−1) and (k+1,j), and retains the smallest sum over all possible k partition points k in the first two-dimensional table.

18. The system of claim 11, wherein the processor device performs one of:

executing a first calculation operation for reducing the time complexity, and executing a second calculation operation for reducing the space complexity.

19. The system of claim 18, wherein the processor device, for reducing the time complexity, performs one of:
scans each element indexed i of the input partition for verifying a sufficient condition for ensuring that a value in the globally optimal subset for each element indexed i is equal to zero, wherein the condition is determined by the equation s(i)>2FE, where F is the multiplicative factor and is a variable, and E a size of one pointer, and s(i) is a second function for measuring, for both the matching segments and the non-matching segments, a size of data on a disk, wherein if the condition holds, the element indexed i is declared to remain of type 0, which partitions the rest of the elements into two parts, and configures the first two-dimensional table to become a four-dimensional table with C[i,j,L,R] being the global cost of the globally optimal subset of elements i, i+1, □, j, with bordering elements i−1 and j+1 being of type L and R, where L, R∈{0,1}.

20. The system of claim 11, wherein the processor device, for reducing the space complexity, stores in the PS[i,j] matrix at an entry indexed (i,j) one of a determined value at which a range of (i,j) of the matching segments has been split into sub-parts for obtaining the optimal subset for the range, and zero if the value does not exist.

21. A computer program product for optimizing a partition of a data block into matching and non-matching segments in data deduplication using a processor device in a computing environment, the computer program product comprising a non-transitory computer-readable storage medium having computer-readable program code portions stored therein, the computer-readable program code portions comprising:

an executable portion that applies an optimal calculation operation in polynomial time to the matching segments for selecting the globally optimal subset of a set of the matching segments according to overhead considerations for minimizing an overall size of a deduplicated file by determining a trade off between a time complexity and a space complexity; wherein applying the optimal calculation operation to the matching segments determines which of the matching segments should be preserved;

an executable portion that splits a sequence of the matching segments into sub-parts for obtaining a globally optimal subset;

an executable portion that applies the optimal calculation operation on the sub-parts of the matching segments;

an executable portion that combines solutions of the optimal calculation operation of the sub-parts into the optimal calculation operation for an entire range of the sequence of the matching segments;

an executable portion that builds the globally optimal subset by means of a first two-dimensional table represented by a matrix C[i,j], and storing a representation of the globally optimal subset in a second two-dimensional table represented by a matrix PS[i,j] that holds, at entry [i,j] of the matrix, the globally optimal subset for a plurality of parameters in form of a bit-string of length j−i+1, wherein i and j are indices of bit positions corresponding to segments; and an executable portion that declares each of the matching segments that are determined not to be preserved as new segments added to the non-matching segments;

wherein for $1 \leq i \leq j \leq n$, C[i,j] is a global cost of the globally optimal partition of a sub-sequence of elements i, i+1, ..., j−1, j, when surrounding elements i−1 and j+1 are of the non-matching segments type, where n is a number of elements and a number of rows and columns in the matrix C.

22. The computer program product of claim 21, further including an executable portion that applies the optimal calculation operation on each sequence of the matching segments that are surrounded on both ends of the matching segments by two of the non-matching segments.

23. The computer program product of claim 21, further including an executable portion that:
applies a plurality of functions for determining a trade off between the time complexity and the space complexity, wherein the plurality of functions include at least a first function for determining a global cost of storing pointers in meta-data and a second function for measuring, for both the matching segments and the non-matching segments, a size of data on a disk, and
uses a multiplicative factor for counting one byte of meta-data as equivalent to F-bytes of data that are written to the disk, wherein F is the multiplicative factor and is variable.

24. The computer program product of claim 21, further including an executable portion that:
initializes the first two-dimensional table by storing optimal values in a main diagonal of the first two-dimensional table at C[i,i], for $1 \leq i \leq n$ and just below the main diagonal of the first two-dimensional table at C[i,i−1], wherein default values are provided for initializing the global cost, and
orders a plurality of iterations by an increasing difference between j and i for applying the optimal calculation operation to the matching segments for selecting the globally optimal subset.

25. The computer program product of claim 24, further including an executable portion that, upon filling up the first two-dimensional table:
retrieves the global cost of the globally optimal subset from the first two-dimensional table at location C[1,n], and the corresponding partition from the second two-dimensional table at location PS[1,n].

26. The computer program product of claim 21, further including an executable portion that:
initializes the two-dimensional table by setting a global cost to zero for ranges of a form i+1,i)[i+1, i] with a corresponding bit-string denoted as an empty string, and
compares, for the ranges of a form [i,i], a size of the matching segments with the global cost of defining the matching segments as being part of the non-matching segments.

27. The computer program product of claim 21, further including an executable portion that:
fills the first two-dimensional table by diagonals, each corresponding to a constant difference represented by the equation diff=j−i, and within each of the diagonals, filling by increasing i, wherein i is the index of a row, j is the index of a column and diff is a constant difference between j and i,
assigns default values in the first two-dimensional table, corresponding to all diff+1 elements in between i and j being defined as matching segments, wherein the default values correspond to a bitstring of diff+1 zeros in the PS [i,j] matrix, wherein the global cost of a default partition is stored as diff+1 metadata blocks at a total global cost of (diff+1)FE, where F is the multiplicative factor and is variable and E is a size of one pointer,
determines the globally optimal subset by one of accepting the default partition of all of the diff+1 elements for a given range remaining as the matching segments and finding at least one element with index k, with $i \leq k \leq j$ which is turned into a non-matching element, and then recursively applying the optimal calculation operation on sub-ranges (i,k−1) and (k+1,j), wherein elements surrounding the sub-ranges i−1 and k for (i,k−1), and k and j+1 for (k+1,j), are of a type of the non-matching segments,
checks a sum of the global cost for each possible partition of the range of (i,j) into two sub-ranges (i,k−1) and (k+1,j), and
retains the smallest sum over all possible k partition points k in the first two-dimensional table.

28. The computer program product of claim 21, further including an executable portion that performs one of:
executing a first calculation operation for reducing the time complexity, and
executing a second calculation operation for reducing the space complexity.

29. The computer program product of claim 28, further including an executable portion that, for reducing the time complexity, performs one of:
scanning each element indexed i of an input partition for verifying a sufficient condition for ensuring that a value in the globally optimal subset for each element indexed i is equal to zero, wherein the condition is determined by the equation s(i)>2FE, where F is the multiplicative factor and is a variable, and E a size of one pointer, and s(i) is a second function for measuring, for both the matching segments and the non-matching segments, a size of data on a disk, wherein if the condition holds, the element indexed i is declared to remain of type 0, which partitions the rest of the elements into two parts, and
configuring the first two-dimensional table to become a four-dimensional table with C[i,j,L,R]being the global cost of the globally optimal subset of elements i, i+1, □, j, with bordering elements i−1 and j+1 being of type L and R, where L, R∈{0,1}.

30. The computer program product of claim 21, further including an executable portion that performs, for reducing the space complexity, stores in the PS [i,j] matrix at an entry indexed (i,j) one of a determined value at which a range of (i,j) of the matching segments has been split into sub-parts for obtaining the optimal subset for the range, and zero if the value does not exist.

* * * * *